J. MURPHY.
Apparatus for Treating Rubber Hose Tubing, &c., with Antiseptics.

No. 151,419.      Patented May 26, 1874.

UNITED STATES PATENT OFFICE.

JOHN MURPHY, OF NEW YORK, N. Y.

IMPROVEMENT IN APPARATUS FOR TREATING RUBBER HOSE, TUBING, &c., WITH ANTISEPTICS.

Specification forming part of Letters Patent No. 151,419, dated May 26, 1874; application filed December 17, 1873.

*To all whom it may concern:*

Be it known that I, JOHN MURPHY, of the city and county of New York, in the State of New York, have invented certain new and useful Improvements in Apparatus for Charging Rubber Goods, &c., with Antiseptics.

My present improvements relate to an apparatus especially adapted for the practical application of a certain method or process of treating vulcanized rubber hose, tubing, &c., of my own invention, and described in Letters Patent heretofore granted to me.

The object of my invention is to produce an apparatus applicable generally to the charging of rubber hose, tubing, &c., with antiseptics by means of pressure, but more particularly to charging the same and other articles with antiseptics of a volatile nature, and by its use to obviate the wasteful expenditure of said volatile matters heretofore experienced. My invention consists in the novel combination of a suitable receiving or charging tank, suitable pumps for charging the tank with antiseptics under pressure, a steam-jacket inclosing the charging-tank, and a vapor-condensing apparatus; also, in the combination of such an apparatus as is produced by said combination with pneumatic pumps for exhausting the air within the charging-tanks prior to the introduction therein of the antiseptic matter, and to assist in charging and discharging fluids from the receiving-tank; and I do hereby declare that the following specification, taken in connection with the drawings furnished and forming a part of the same, is a clear, true, and accurate description of an apparatus embodying the several features of my invention.

Figure 1:
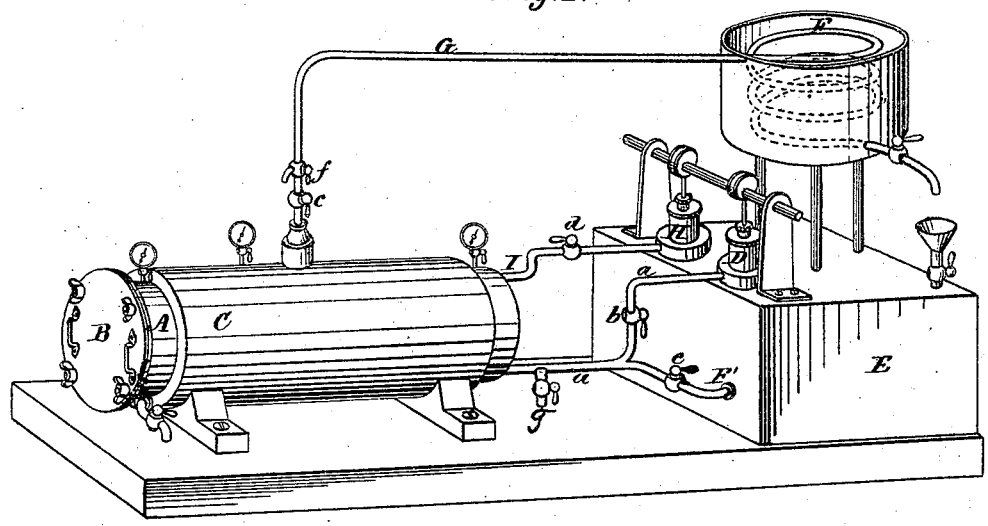
Figure 2:
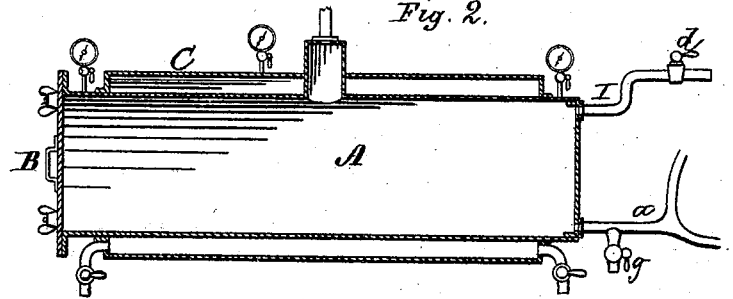
Figure 3:
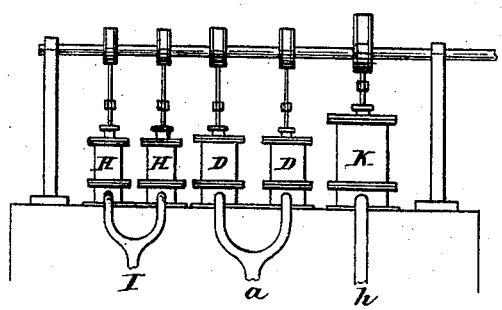

Referring to the drawings, Figure 1 represents, in perspective, my apparatus in one of its simplest forms. Fig. 2 represents, in longitudinal vertical section, the charging-tank and its inclosing-jacket. Fig. 3 represents, in front view, duplicate pneumatic pumps, duplicate charging-pumps, and a simple transfer-pump.

A denotes the charging or receiving tank. It should be made of heavy boiler-iron, and fully capable of safely carrying a hydrostatic interior pressure of, say, three hundred and fifty or four hundred pounds to the square inch. It has one open end to, which a removable head, B, is fitted, and provided with bolts and hand-nuts and suitable joint-packing material, which will admit of so closing the tank as to enable the head to withstand the required degree of internal pressure and maintain a tight joint at the coincident surfaces of tank and head. In setting the tank one end will, preferably, be sufficiently lower than the other to secure a ready flow of the fluid contents of the tank toward the inlet-aperture, which is located at the lowest end, and which may thereby, also, be employed as the exit-aperture for the antiseptic matter. The tank should, for convenience of operatives, be provided with vacuum and pressure gages. C denotes the steam-jacket, which incloses the greater portion of the charging-tank, and is provided with an inlet steam-pipe and an exit for condense-water. Both of these pipes are provided with suitable cocks. It should also be provided with a pressure-gage or a thermometer, or with both, for correctly indicating the degree of pressure and heat attained. D denotes the charging-pump, which forces the antiseptic matter from a supply-tank at E into the charging-tank, by the way of connecting-pipe, as at $a$, provided with a suitable stop-cock, as at $b$. F denotes a vapor-condensing worm and tank, which communicates with the interior of the charging-tank by way of pipe G; also provided with a suitable stop-cock, as at $c$, between the worm and the tank. H denotes the pneumatic pump for exhausting the air in the charging-tank by means of suitable connecting-pipe I, provided with a stop-cock, as at $d$, as in the case of the other pipes communicating with the tank. By having a double set of valves to this pump, and having each set arranged so as to be readily rendered operative or inoperative in a manner well known, it can be made at pleasure to draw the air from the tank or to force air or vapors into it. F' denotes a pipe provided with a suitable stop-cock, as at $e$, which communicates with the pipe $a$ and the supply-tank.

In Fig. 3 the pneumatic and hydrostatic pumps are shown in duplicate. Each pair communicate with their respective single pipes connecting them with the charging-tank. The large pump K, as shown, is intended to perform the mere transfer of fluids from the supply-tank to the charging-tank, and need not be capable of performing further service after the latter tank has been filled to ordinary fluid-pressure. Its pipe $h$ will be provided with a suitable cock, and will connect with the pipe $a$ at a convenient point.

The operation of my apparatus is as follows: The receiving-tank is filled with the goods to be treated by way of the open end, after removal of the head. If hose is to be treated, it may be laid lengthwise, or arranged in coils in such a manner that the air will be driven from the interior of the hose as the liquid enters. After being so filled, the head is put on and well secured. The cock at $c$ is then opened to admit of the escape of air, and the antiseptic fluid is forced from the supply-tank at E by the pump D, through pipe $a$. When the tank has been completely filled it will be indicated by the flow of the fluid from the open gage-cock, at $f$, in pipe G. With the pneumatic pump for exhausting the air from the charging-tank, the air can be drawn from the interstices in the goods, and more rapid charging be effected. The vacuum in the charging-tank will also serve as a means for filling the tank with fluid from the supply-tank, as by closing the cock at $b$, and opening that at $e$, the fluid will be rapidly drawn into the tank, and when it ceases to so act, the cock $e$ will be closed and that at $b$ opened, and the charging-pump started. When filled, both cocks $c$ and $f$ will be closed, and the pressure raised to the desired point, to be indicated by the pressure-gage, after which the pump will be stopped, and the cock $b$ in pipe $a$ closed. After being so charged the same pressure will be maintained for a suitable time, varying according to the nature of the goods to be treated, from one hour upward. Should the pressure materially decrease from the entrance of the fluids into the goods, the pump will again be started from time to time.

After sufficient time has elapsed, the cock at $e$ in pipe F' will be opened, and the fluid will be forced to some extent out of the receiving-tank back into the supply-tank, and when the pressure has been so far lessened as not to cause further flow, the cock at $c$ will be opened to allow of the admission of air through the coil and pipe G into the charging-tank.

In most cases the supply-tank will be located lower than the charging-tank, which will admit of the ready outward flow of the fluid from the latter into the former.

When rapid work is desired, and a double-acting pneumatic pump is employed, the cock at $c$ will be closed, and air forced into the charging-tank, which will rapidly effect a discharge of the fluid therefrom. When it is found that air is blowing into the supply-tank, the cock at $e$ will be closed. Such fluid as remains in the pipe and charging-tank can be drawn from a cock at $g$ in pipe $a$. When all the fluid has thus been drawn off, all the cocks, except at $c$, are closed, and steam is let into the jacket, which has hitherto been but slightly heated, if at all, and the temperature thereof raised to, say, 212° Fahrenheit, by which means the goods in the charging-tank will be well dried off, and the vapors passing into the condensing-worm will be recovered in fluid, and conducted into the supply-tank for further use.

To secure rapid drying, the pneumatic pump may be employed for injecting air under light pressure from time to time. After the vapors have been well disposed of, the head B is removed, and the goods taken from the charging-tank. Many times vapors only will be requisite in the charging-tank, in which case the supply-tank will serve as the vapor-receiver, and the pneumatic pump will be employed for exhausting the air in the charging-tank, and subsequently for filling it with the vapor at any desired degree of pressure. The condensing-worm may be used, as before described, for recovering the excess of vapor prior to the opening of the charging-tank.

Having thus described my invention, I claim as new, and to be secured by Letters Patent—

1. An apparatus for treating hose, tubing, and other goods with antiseptics, consisting of a receiving-tank, a charging-pump, a steam-jacket inclosing the receiving-tank, and a condensing apparatus connected with the receiving-tank, substantially as described.

2. In an apparatus for treating hose, tubing, and other goods with antiseptics, a receiving-tank, a pneumatic pump, and a pump for forcing fluids into said tank, in combination with a steam-jacket inclosing the receiving-tank, and a condensing-still, substantially as described.

JOHN MURPHY.

Witnesses:
A. SPADING,
WILLIAM LEWIS.